United States Patent
Kojima et al.

(12) 
(10) Patent No.: US 6,580,580 B1
(45) Date of Patent: Jun. 17, 2003

(54) MAGNETIC MEMORY DRIVE AND OPTICAL DEVICE

(75) Inventors: Hiroaki Kojima, Ehime (JP); Kou Shinomori, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,359

(22) PCT Filed: Nov. 30, 1999

(86) PCT No.: PCT/JP99/06676

§ 371 (c)(1),
(2), (4) Date: Aug. 1, 2000

(87) PCT Pub. No.: WO00/33302

PCT Pub. Date: Jun. 8, 2000

(30) Foreign Application Priority Data

Dec. 2, 1998 (JP) .......................... 10-342880

(51) Int. Cl.$^7$ .............................. G11B 5/596
(52) U.S. Cl. ................................. 360/77.03
(58) Field of Search .................... 360/77.03, 78.11; 369/30.17, 44.26

(56) References Cited

U.S. PATENT DOCUMENTS

| | | | |
|---|---|---|---|
| 4,558,383 A | * 12/1985 | Johnson | 360/77.03 |
| 4,613,916 A | * 9/1986 | Johnson | 360/78.11 |
| 4,884,259 A | * 11/1989 | Horikawa et al. | 369/44.26 |
| 4,954,905 A | * 9/1990 | Wakabashi et al. | 360/77.03 |
| 5,195,067 A | * 3/1993 | Yanagi | 369/30.17 |
| 5,963,516 A | 10/1999 | Hashimoto et al. | |
| 5,970,033 A | * 10/1999 | Nakano et al. | 369/44.29 |
| 6,181,652 B1 | * 1/2001 | Katou et al. | 369/44.32 |

FOREIGN PATENT DOCUMENTS

| | | |
|---|---|---|
| EP | 0 753 851 | 1/1997 |
| EP | 0 762 396 | 3/1997 |
| JP | 7-169070 | 7/1995 |
| JP | 8-7284 | 1/1996 |
| JP | 9-120564 | 5/1997 |
| JP | 10-091971 | 4/1998 |

* cited by examiner

*Primary Examiner*—David Hudspeth
*Assistant Examiner*—Fred F. Tzeng
(74) *Attorney, Agent, or Firm*—Wenderoth, Lind & Ponack, L.L.P.

(57) ABSTRACT

In a magnetic memory drive, a diffraction grating 16 receives a beam emitted by a light source 1 to generate three beams of 0th-order and ±1st-order light beams, and a condensing system 17 converges the beams on a magnetic recording medium 4. The beams reflected from the medium is received by a photodetector 15 which outputs signals corresponding to quantities of the received beams, and a signal processor 61 processes the signals to output a tracking error. The photodetector comprises a plurality of light-receiving sections. When crosstalk from a light-receiving section for the 0th-order beam to light-receiving sections for the ±1st-order beams is $\epsilon$ and crosstalk from the light-receiving sections for the ±1st-order beam to the light-receiving section for the 0th-order is $\epsilon'0$ in the light-receiving sections of the photodetector, quantity of light $Q_0$ of the 0th-order light beam and quantity of light $Q_{\pm 1}$ of the ±1st-order light beams has a relationship represented by a following equation:

$$Q_0 : Q_{\pm 1} = \sqrt{\frac{2 \times \varepsilon'}{\varepsilon}} : 1.$$

Thus, the tracking error is reduced.

2 Claims, 7 Drawing Sheets

MAGNETIC MEMORY DRIVE AND OPTICAL DEVICE

TECHNICAL FIELD

The present invention relates to a magnetic memory drive which can detect a tracking error signal stably with high precision, and which can record, reproduce or erase information accurately to or from a magnetic recording medium such as a hard magnetic disk or a flexible magnetic disk.

BACKGROUND ART

Previously, track positioning is carried out mechanically in a rough manner by using a stepping motor or the like because a magnetic disk system for recording information on a magnetic recording medium has a very wide track pitch of approximately 200 μm as compared with that of an optical recording medium that is approximately 1.6 μm. However, recently there have been an increasing demand for track pitches of several to a few tens micrometers in order to achieve a higher capacity. Then, the track positioning mechanism is required to be more accurate than the conventional mechanism.

In a conventional magnetic memory drive for detecting a tracking error signal optically, a laser diode light source emits a linearly polarized diverging beam, and a diffraction grating splits it into a plurality of beams. Then, the beam transmits through an objective lens to be condensed onto a magnetic recording disk. The beam is reflected by the disk to transmit through the objective lens and is split by the diffraction grating. A photodetector receives the beam, and it outputs an electric signal in accordance with a quantity of the received light. A signal processor processes the electric signal received from the photodetector and outputs a tracking error signal. Then, a driving section adjusts the position of the disk according to the tracking error signal. Then, a magnetic head records and reproduces information.

The diffraction grating has a first region formed on a face closer to the light source and a second region formed on another face on the opposite side. The beam emitted from the light source incident on the first region is split into three beams, that is, 0th-order and ±1st-order diffracted beams, and the three beams are further split into a plurality of beams by the second region. Only the 0th-order diffracted beam among the diffracted beams generated by the second region is incident on the aperture of the objective lens. Moreover, the beam, reflected by the disk, diffracted and being incident on the second region is split into a plurality of diffracted beams, and only the ±1st-order diffracted beams among them are received by the photodetector.

In a conventional magnetic memory drive, the ratio of quantities of lights of the three beams generated in the first region of the diffraction grating is appropriately set according to conditions on the machining property of the diffraction grating and on the design of the signal processor. Alternatively, an optical device fabricated as an integrated body of a light source, a diffraction grating and a photodetector is known as an element used for an optical disk drive which uses the three beam method, and it can be applied to a conventional magnetic memory drive under appropriate optical design conditions. Then, the optical device for optical disk is adopted from the viewpoint of cost reduction, but in this case, quantity of light $Q_0$ of the 0th-order light beam and quantity of light $Q_{\pm 1}$ of the ±1st-order light beams have a following ratio of $Q_0:Q_{\pm 1}=5:1$, according to its applicability to the optical disk.

For example, grating patterns formed in the first and second regions of the diffraction grating respectively have patterns of a constant pitch, and the grating pattern of the first region is perpendicular to that of the second region. The grating pitch of the first region is larger than that of the second region. The ±1st-order diffracted beams formed by the second region and received by the photodetector are respectively composed of three beams diffracted by the first region and three beams diffracted by the second region. The photodetector has six light receiving sections for the six beams. The six light-receiving sections of the photodetector 15 output electric signals corresponding to the quantities of received lights of the respective beams, and they are processed in a signal processor to output a tracking error signal. Upon receipt of the tracking error signal, a driver adjusts the relative position to disk 4. Consequently, a tracking operation to a desired track is carried out.

Here, in the conventional magnetic memory drive having the above-mentioned structure, the electric signals V5, V6 and V7, derived from the beam that has been reflected and diffracted by the disk and received by the photodetector, is determined on principle by only the displacement of the beam in the X-direction with respect to any one of the guide grooves, and it has nothing to do with the position of the guide groove on the disk. Therefore, it is supposed that the modulation degree and the maximum amplitude are always constant whether the position in question is located in the inner circumferential portion or in the outer circumferential portion on the disk. However, actually, in the conventional magnetic memory drive, the modulation degree and the maximum amplitude vary with the inner circumferential portion and the outer circumferential portion of the disk.

DISCLOSURE OF INVENTION

An object of the present invention is to provide a magnetic memory drive which can reduce tracking errors.

A magnetic memory drive according to the present invention comprises a light source which emitting a light beam, a diffraction grating which receives the beam emitted by the light source to generate three beams of 0th-order and ±1st-order light beams, a condensing system which converges the beams generated from the diffraction grating into a minute spot on a magnetic recording medium on which periodic physical variations are forced for providing variations in reflectivity, a photodetector which receives the beams reflected and diffracted from the magnetic recording medium and again passing through the condensing system and outputs signals corresponding to quantities of the received beams, a signal processor which processes the signals outputted from the photodetector to output a tracking error, a driver which receives the tracking-error signal outputted from the signal processor and positions the beams on a desired track, and a magnetic head which records information on the magnetic recording medium or reproduces or erases information on the magnetic recording medium. The photodetector comprises a plurality of light-receiving sections. When crosstalk from a light-receiving section for the 0th-order beam to light-receiving sections for the ±1st-order beams is $\epsilon$ and crosstalk from the light-receiving sections for the ±1st-order beam to the light-receiving section for the 0th-order is $\epsilon'$ in the light-receiving sections of the photodetector, quantity of light $Q_0$ of the 0th-order light beam and quantity of light $Q_{\pm 1}$ of the ±1st-order light beams has a relationship represented by a following equation:

$$Q_0 : Q_{\pm 1} = \sqrt{\frac{2 \times \varepsilon'}{\varepsilon}} : 1. \quad (1)$$

An integrated optical device according to the is invention comprises the light source for emitting a light beam, the diffraction grating for receiving the beam emitted from the light source and for generating three beams of 0th-order and ±1st-order light beams, and the photodetector which receives a beam and outputs a signal corresponding to a quantity of received light. The quantity of light $Q_0$ of the 0th-order light beam and the quantity of light $Q_{\pm 1}$ of the ±1st-order light beams has the above-mentioned relationship.

This summary of the invention does not necessarily describe all necessary features so that the invention may also be a sub-combination of these described features.

An advantage of the present invention is that it becomes possible to reduce the tracking error of the magnetic memory drive.

BRIEF DESCRIPTION OF DRAWINGS

These and other objects and features of the present invention will become clear from the following description taken in conjunction with the preferred embodiments thereof with reference to the accompanying drawings, and in which.

BEST MODE FOR CARRYING OUT THE INVENTION

Figure 1:
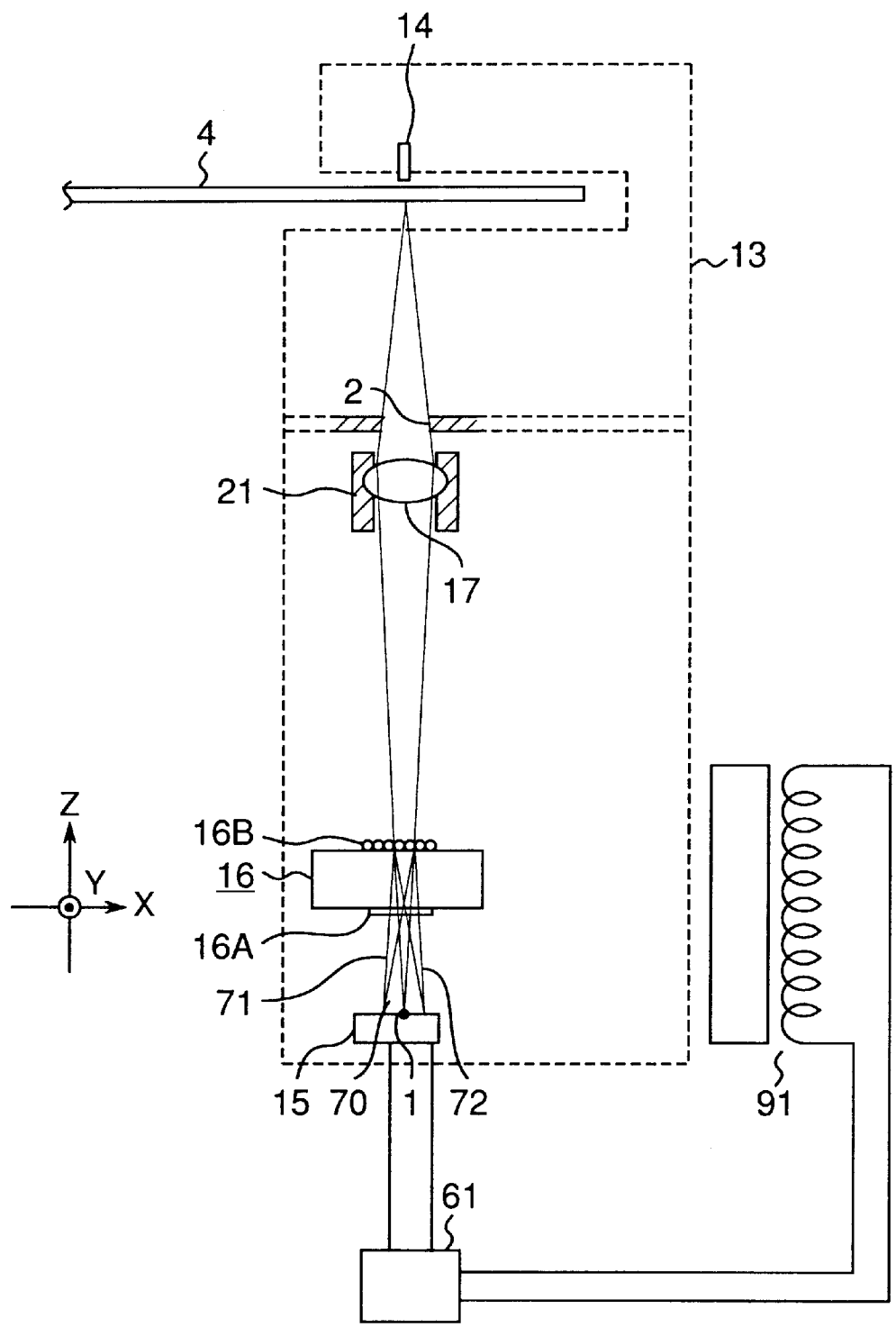
FIG. 1 is a schematic side view of a magnetic memory drive of an embodiment of the present invention.

Referring now to the drawings, wherein like reference characters designate like or corresponding parts throughout the several views, FIG. 1 shows an example of a magnetic memory drive for detecting a tracking error signal by using light is explained. The magnetic memory drive is provided with a laser diode light source (hereinafter, referred to as "light source") 1 for emitting a linearly polarized diverging beam (hereinafter, referred to as "beam") 70, a diffraction grating 16 which receives the beam 70 emitted from the light source 1 and splits it into a plurality of beams; an objective lens 17 which receives the beam 70 that has passed through the diffraction grating 16 and condense it onto a magnetic recording medium (hereinafter, referred to as "disk") 4, a supporting member 21 for supporting the objective lens 17, an aperture 2 for setting the aperture number of the objective lens 17, a photodetector 15 which receives the beam 70 that has been reflected by the disk 4, diffracted, again allowed to pass through the objective lens 17, and split by the diffraction grating 16, and which outputs an electric signal in accordance with a quantity of the received light, a signal processor 61 which processes the electric signal received from the photodetector 15 and outputs a tracking error signal, and a driving section 91 for adjusting the relative positions between a base 13 and the disk 4, the base 13 including a tracking signal detection optical system for receiving the tracking error signal outputted from the signal processor 61 and a magnetic head 14 for recording and reproducing information. The ratio of quantities of lights of the three beams generated in the region 16A or 16B in the diffraction grating is determined by the shape of the diffraction grating and the groove depth thereof.

The diffraction grating 16 has a region 16A formed on a face closer to the light source 1 and a region 16B formed on another face on the opposite side. The linearly polarized diverging beam emitted from the light source 1 is incident on the region 16A of the diffraction grating 16 and is split into three beams, that is, a 0th-order and ±1st-order diffracted beams, and the three beams generated by the region 16A are further split into a plurality of beams by the region 16B. Here, the grating pitches of the region 16B are designed so that, in a light path from the light source 1 to the objective lens 17, only the 0th-order diffracted beam among the diffracted beams generated by the region 16B is incident on the aperture of the objective lens 17. Moreover, the beam 70, reflected by the disk 4, diffracted and being incident on the region 16B of the diffraction grating 16 is split into a plurality of diffracted beams, and only the ±1st-order diffracted beams 71 and 72 among them are received by the photodetector 15. An optical device fabricated as an integrated body of the light source 1, the diffraction grating 16 and the photodetector 15, known as an element used for an optical disk drive which uses the three beam method, can be used in the magnetic memory drive.

Figure 2:
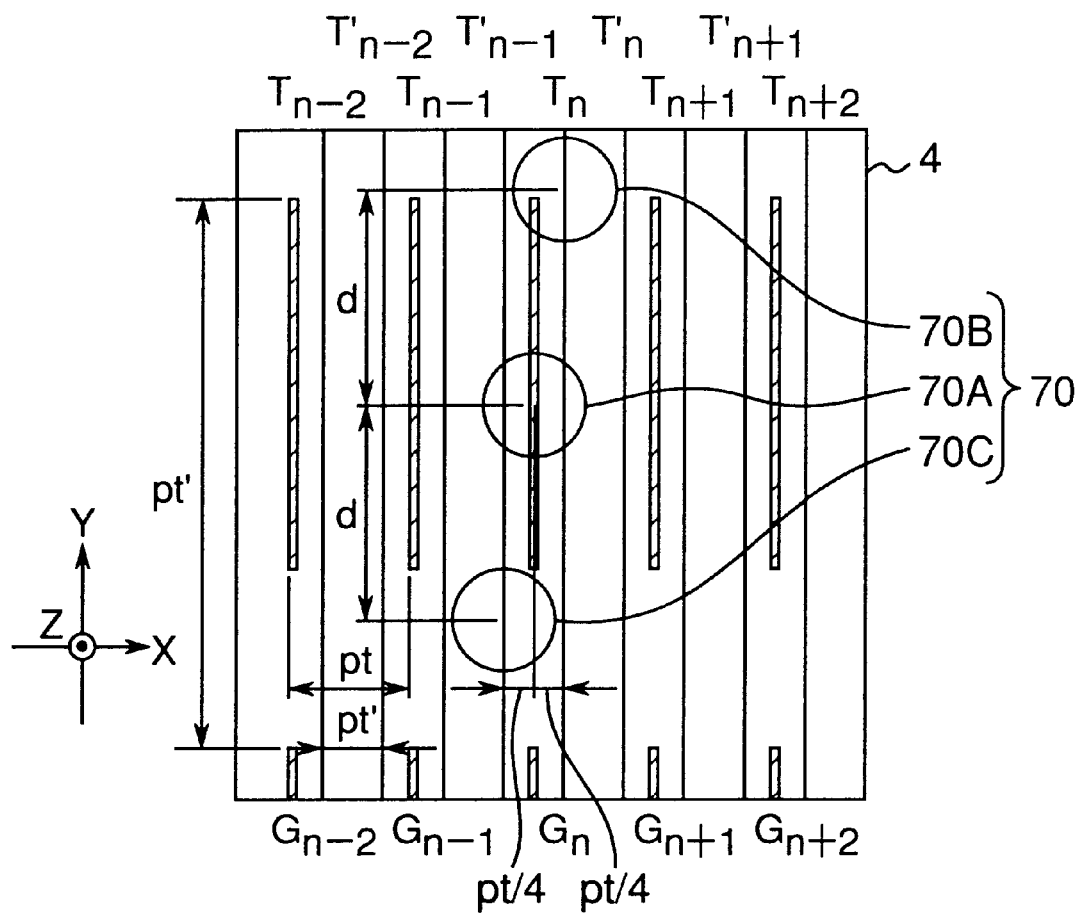
FIG. 2 is a schematic diagram that shows the relationship of a disk in the magnetic memory drive and beams converged thereon.

FIG. 2 shows a relationship between the disk and the converged beam in the magnetic memory drive. As shown in FIG. 2, on a disk 4, guide grooves are formed in a dispersed manner, each groove being formed between adjacent tracks on every other track (areas to or from which information is recorded or reproduced by a magnetic head 14), so that a tracking error signal is optically detected depending on the difference in reflection coefficient between the guide grooves and the other areas. In FIG. 2, $T_{n-1}$, $T'_{n-1}$, $T_n$, $T'_n$, $T_{n+1}$, $T'_{n+1}$, . . . represent tracks, and $G_{n-1}$, $G_n$, $G_{n+1}$, . . . represent guide grooves. The track pitch pt" is set to 10 µm, the guide groove pitch pt is set to 20 µm, and the width of the guide groove is set to 2 µm, respectively. Moreover, in an attempt to modulate the detection signal by using a high frequency carrier so as to avoid adverse effects resulting from irregularities in the reflection coefficient and scratches on the surface of the disk, the guide grooves are intermittently formed also in the circumferential direction. The revolution number of the conventional magnetic memory drive is 720 rpm, and the pitch pt' of the guide grooves in the circumferential direction is set in a manner so as to provide a carrier frequency of 20 kHz at the revolution number of disk of 720 rpm. Supposing that the wavelength of the beam 70 emitted from the light source 1 is λ, the aperture number on the image side of the objective lens 17 is represented by the following Equation:

$$NA = k \times \frac{\lambda}{pt}. \tag{2}$$

Normally, the value of k is selected in the range of 0.9 to 1.1. When k=1 and λ=0.79 μm, NA=0.04.

Among the beams 70, 70A denotes 0th-order diffracted beam generated from the region 16A of the diffraction grating 16, and 70B and 70C denote ±1st-order diffracted beams generated from the region 16A of the diffraction grating 16. The three beams 70A to 70C are positioned on the disk 4 with a distance of pt/4 in the X direction for a guide groove.

Figure 3A:
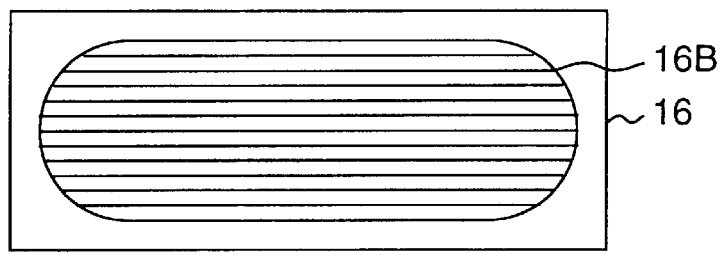
FIGS. 3A and 3B are schematic diagrams of patterns of diffraction grating and FIG. 3C is a diagram on the relationship between a photodetector and beams.
Figure 3B:
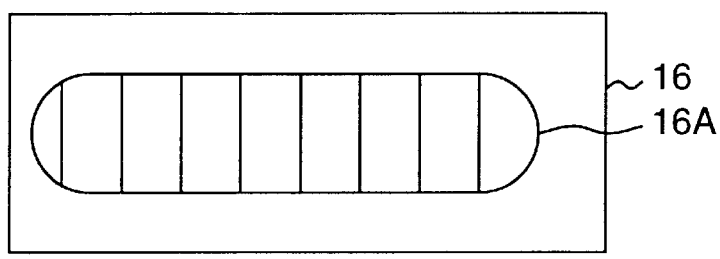
Figure 3C:
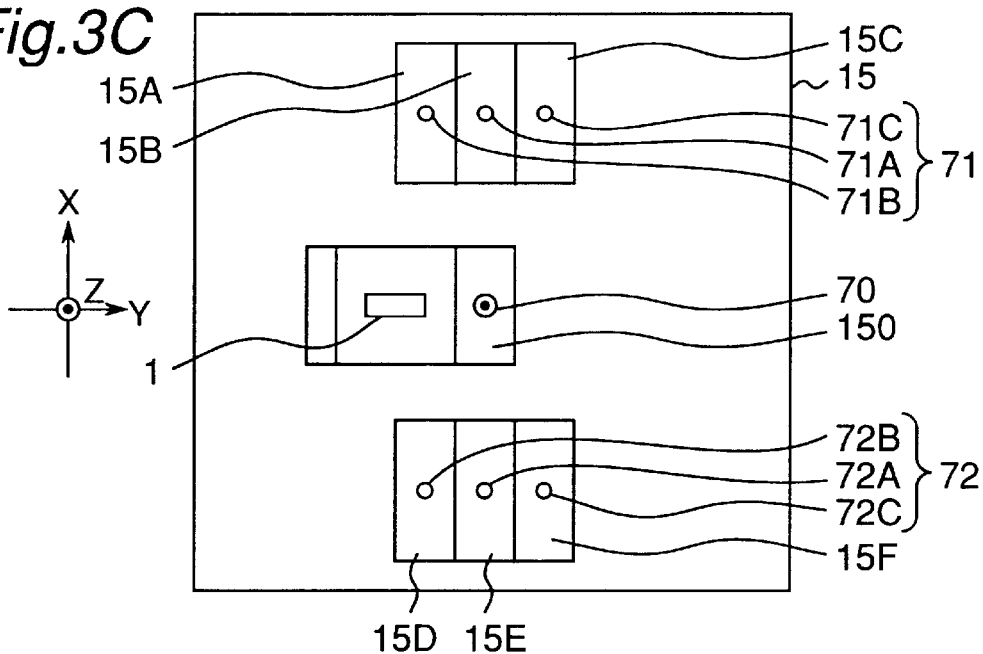

FIGS. 3A and 3B show grating patterns of the diffraction grating 16 in the magnetic memory drive, and FIG. 3C shows a relationship between the photodetector 15 and the beams in the magnetic memory drive. As shown in FIGS. 3A and 3B, grating patterns formed in the regions 16A and 16B of the diffraction grating 16 respectively have patterns of a constant pitch, and the grating pattern of the region 16A and that of the region 16B are perpendicular to each other. The grating pitch of the region 16A is 10 μm, and that of the region 16B is 3 μm. As shown in FIG. 3C, ±1st-order diffracted beams 71 and 72 formed by the region 16B and received by the photodetector 15 are respectively composed of three beams 71A to 71C and 72A to 72C. The beams 71A and 72A are return light beams of the beam 70A from the disk 4, and the beams 71B and 72B are return ones of the beam 70B therefrom, and the beams 71C and 72C are return ones of the beam 70C therefrom. The photodetector 15 has six light receiving sections 15A to 15F. The beam 71A is received by the light receiving section 15B, the beam 71B is received by the light receiving section 15A, the beam 71C is received by the light receiving section 15C, the beam 72A is received by the light receiving section 15E, the beam 72B is received by the light receiving section 15D, and the beam 72C is received by the light receiving section 15F.

As shown in FIG. 3C, the light source 1 is placed on the photodetector 15 formed by etching a silicon substrate. Moreover, a mirror 150 is formed on the silicon substrate. The beam 70 emitted from the light source 1 is reflected by the mirror 150 and goes in the Z-axis direction perpendicular to the X-Y plane on which the light-receiving sections 15A to 15F of the photodetector 15 are formed.

Figure 4:
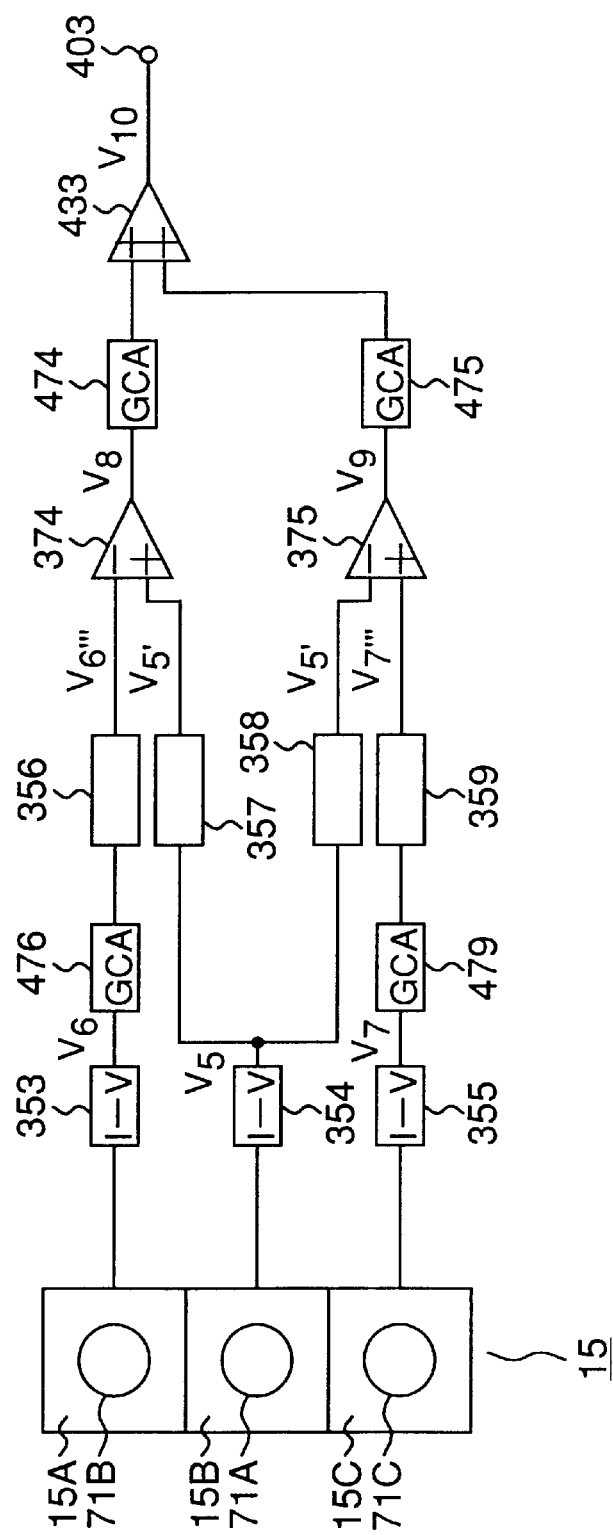
FIG. 4 is a circuit diagram of a signal processing circuit of the magnetic memory drive.
Figure 5A:
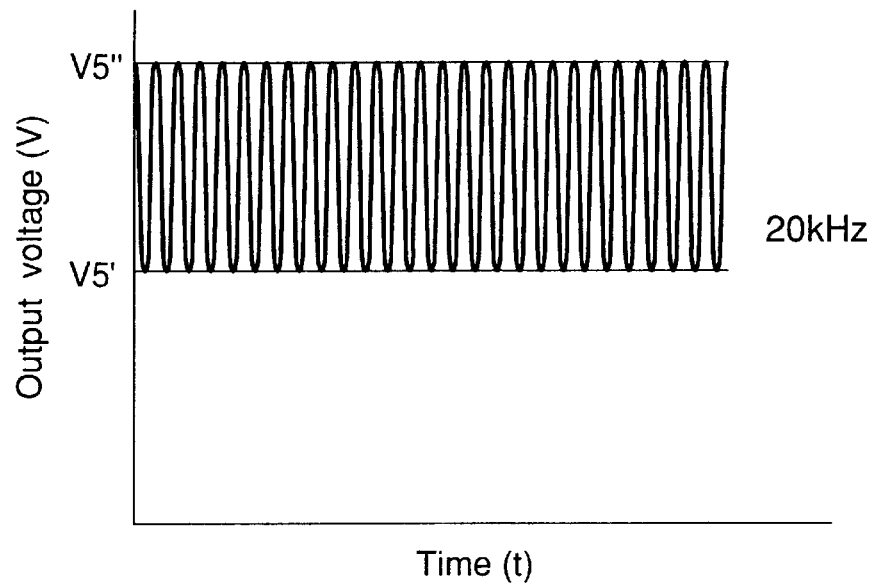
FIGS. 5A and 5B are signal waveform diagrams in the signal processing circuit in the magnetic memory drive when the disk is still and when it is moving.

FIG. 4 shows a signal processor in the magnetic memory drive. As shown in FIG. 4, the light-receiving sections 15A, 15B and 15C (or 15D, 15E and 15F) of the photodetector 15 are respectively connected to I-V converters 353, 354 and 355. Thus, electric signals outputted from the light-receiving sections 15A, 15B and 15C (or 15D, 15E and 15F) of the photodetector 15 are converted to voltage signals by the I-V converters 353, 354 and 355. In a state where the beam is maintained still relative to the disk while the disk 4 is rotating, voltage signal V5 (or V6, V7) outputted from the I-V converter 353, 354 or 355 has a carrier of 20 kHz, as shown in FIG. 5A. In this case, the maximum V5" of V5 is an output value with no guide groove located within the beam, and the minimum value V5' of V5 is an output value in a state where the beam has come to fall on a guide groove as the disk 4 rotates. When the center of the beam is located on the guide groove, the carrier amplitude |V5"−V5'| has a maximum.

Figure 5B:
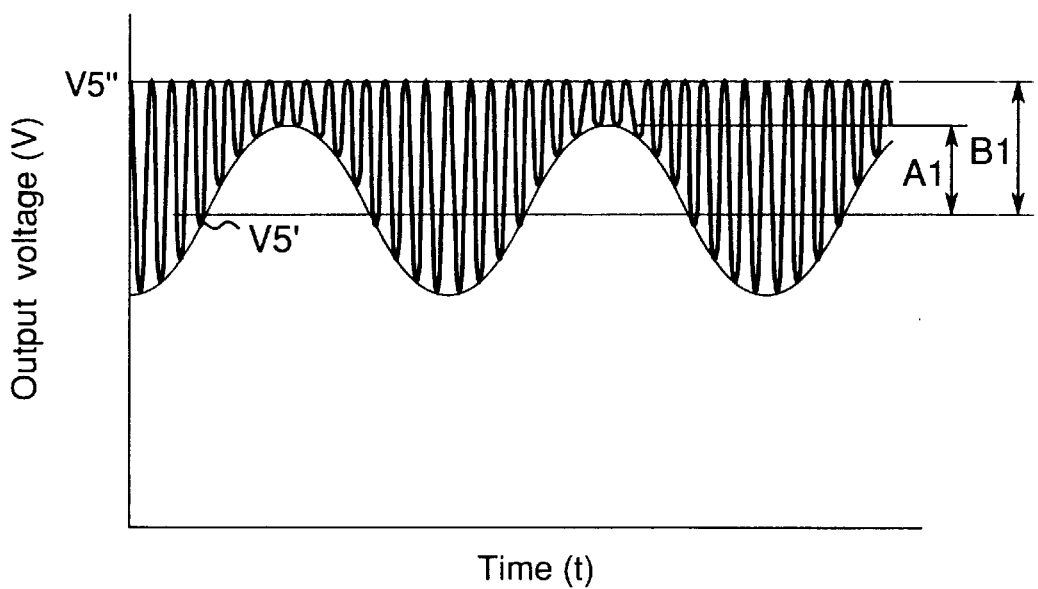

As the beam 70 is displaced in proportion to time t with the disk 4 in rotation, V5 (or V6, V7) has a waveform as shown in FIG. 5B. When the beam 70 has a displacement X from the center of a guide groove (for example, $G_n$) of the disk 4, V5, V6 and V7 are represented by Equations 3 to 5.

$$V5 = \frac{\left[A1 \cdot \cos\left(\frac{2\pi x}{pt}\right) + B1\right][1 + \sin(2\pi ft)]}{2}. \tag{3}$$

$$V6 = \frac{\left[A2 \cdot \sin\left(\frac{2\pi x}{pt}\right) + B2\right][1 + \sin(2\pi ft + \alpha)]}{2}. \tag{4}$$

$$V7 = \frac{\left[-A3 \cdot \sin\left(\frac{2\pi x}{pt}\right) + B3\right][1 + \sin(2\pi ft - \alpha)]}{2}. \tag{5}$$

In the Equations 3–5, f=20 kHz, and α is phase difference between the carriers caused by the three beams apart from each other in the Y-direction.

Moreover, the envelopes of the minimum value of each of the signals represented by Equations 3 to 5, that is, V' (V6', V7')shown in FIG. 5B have waveforms approximately represented by Equations 6 to 8.

$$V5' = A1 \cdot \cos\left(\frac{2\pi x}{pt}\right) + B1. \tag{6}$$

$$V6' = A2 \cdot \sin\left(\frac{2\pi x}{pt}\right) + B2. \tag{7}$$

$$V7' = -A3 \cdot \sin\left(\frac{2\pi x}{pt}\right) + B3. \tag{8}$$

Here, A1/B1 (or A2/B2, A3/B3) is defined as modulation degree MOD. As shown in FIG. 4, the I-V converter 353 is connected to a differential operator 374 through a gain-controlled amplifier 476 and an envelope detector 356. Moreover, the I-V converter 354 is connected to the differential operator 374 through an envelope detector 357. Thus, the voltage signals V6 and V5 outputted from the I-V converters 353 and 354 are adjusted so that the maximum amplitude of V6 becomes equal to the maximum amplitude of V5 at a gain-controlled amplifier 476, and after displacement signals V6'" and V5' have been detected at the envelope detectors 356 and 357, they are subjected to differential operation at the differential operator 374 to be outputted as a voltage signal V8. Furthermore, voltage signals V5 and V7 outputted from the I-V converters 354 and 355 are adjusted so that the maximum amplitude of V7 becomes equal to the maximum amplitude of V5 at a gain-controlled amplifier 479. Then displacement signals V5' and V7'" have been detected at envelope detectors 358 and 359, and they are subjected to differential operation at a differential operator 375 to be outputted as a voltage signal V9. In other words, gain K5 of the gain-controlled amplifier 476 is represented by Equation 9 and gain K6 of the gain-controlled amplifier 479 is represented by Equation 10 respectively.

$$K5 = \frac{A1 + B1}{A2 + B2}. \tag{9}$$

$$K6 = \frac{A1 + B1}{A3 + B3}. \tag{10}$$

The gain of the gain-controlled amplifiers 476 and 479 are set once every predetermined time. This time interval is normally set to several tens seconds to several minutes.

The voltage signals V8 and V9 outputted from the differential operators 374 and 375 have sine waves having a phase difference of π/2 as represented by Equations 11 and 12 respectively.

$$V8 = A4 \cdot \sin\left(\frac{2\pi x}{pt} + \frac{\pi}{4}\right). \quad (11)$$

$$V9 = A4 \cdot \sin\left(\frac{2\pi x}{pt} - \frac{\pi}{4}\right). \quad (12)$$

In Equations 11 and 12, A4 represents the amplitude. The differential operators 374 and 375 are connected to a differential operator 433 through the gain-controlled amplifiers 474 and 475. Thus, the voltage signals V8 and V9 outputted from the differential operators 374 and 375 are adjusted so as to have desired amplitudes in gain-controlled amplifiers 474 and 475, and then added in an operator 433 to be outputted as a voltage signal V10. The voltage signal V10 has a waveform represented by Equation 13, and is outputted from an output terminal 403 as a tracking error signal.

$$V10 = K3 \cdot A4 \cdot \sin\left(\frac{2\pi x}{pt} + \frac{\pi}{4}\right) + K4 \cdot A4 \cdot \sin\left(\frac{2\pi x}{pt} - \frac{\pi}{4}\right) \quad (13)$$
$$= K4 \cdot A4 \cdot \sin\left(\frac{2\pi x}{pt} + \phi 1\right) + K3 \cdot A4 \cdot \sin\left(\frac{2\pi x}{pt} + \frac{\pi}{2} + \phi 1\right).$$

In Equation 13, K3 and K4 respectively represent gains of the gain-controlled amplifiers 474 and 475, and φ1 is −π/4. The tracking error signal V10 becomes a signal having desired phase and amplitude by properly selecting the gains K3 and K4.

Next, tracking operation in the magnetic memory drive having the above-mentioned construction is explained. As shown in FIGS. 1, 2 and 3, the linearly polarized diverging beam 70, emitted from the light source 1, is incident on the region 16A of the diffraction grating 16 so that it is split into three beams, 0th-order diffracted beam and ±1st-order diffracted beams. The three beams generated in the region 16A are further split into a plurality of beams in the region 16B, and among the diffracted light beams generated in the region 16B, only the 0th-order diffracted beam is incident on the aperture of the objective lens 17. The three diffracted beams 70A to 70C are converged on the disk 4 by the objective lens 17 (FIG. 2). The beams 70A to 70C, which have been reflected and diffracted by the disk 4, are allowed to again transmit through the objective lens 17, comes in the region 16B of the diffraction grating 16 and are split into a plurality of diffracted beams. Thus, among the diffracted beams that have been split, only the ±1st-order diffracted beams 71A to 71C and 72A to 72C are received by the light-receiving sections 15A to 15F of the photodetector 15 (FIG. 3C). The light-receiving sections 15A to 15F of the photodetector 15 output electric signals corresponding to the quantities of received lights of the respective beams to the signal processor 61 (FIG. 4). These electric signals are processed in a signal processor 61 and are outputted to a driver 91 as a tracking error signal. Upon receipt of the tracking error signal, the driver 91 adjusts the relative position between the base 13, containing the optical system as well as the magnetic head 14, and disk 4. Consequently, a tracking operation to a desired track is carried out.

In the magnetic memory drive having the above-mentioned structure, on principle, the electric signals V5, V6 and V7, derived from the beam that has been reflected and diffracted by the disk and received by the photodetector, is determined by only the displacement of the beam in the X-direction with respect to any one of the guide grooves, and it has nothing to do with the position of the guide groove on the disk. Therefore, it is supposed that the modulation degree and the maximum amplitude are always constant whether the position in question is located in the inner circumferential portion or in the outer circumferential portion on the disk. However, actually, in the conventional magnetic memory drive, the modulation degree and the maximum amplitude vary with the inner circumferential portion and the outer circumferential portion of the disk. These variations in the modulation degree and the maximum amplitude result in errors during the processing for the tracking signal calculations, thereby causing tracking errors.

The following analysis shows that the variations in the modulation degree and the maximum amplitude that depend on the inner circumferential portion and the outer circumferential portion are caused by crosstalk between signals. It is explained below why tracking errors are caused by crosstalk between signals.

The output signals V5, V6 and V7, obtained as beam shifts in the X-direction, are represented by Equations 3 to 5. However, signal separation characteristic between the adjacent light-receiving sections of the photodetector 15 is not necessarily sufficient because of characteristics of the structure of the light-receiving sections. For this reason, the output signal actually obtained includes an error of several percents due to crosstalk between the light-receiving sections. A ratio of crosstalk from the light-receiving section 15B to the light-receiving section 15A or 15C (or from 15E to 15D or 15F) is denoted as ε, that from the light-receiving section from 15A or 15C to 15B (or 1SD or 15F to 15E) is denoted as ε'. If the values of V5, V6 and V7 including errors due to crosstalk are denoted as V5C, V6C and V7C, they have waveforms represented by Equations 14 to 16, wherein V5, V6 and V7 have values represented by Equations 3 to 5, respectively.

$$V5C = V5 + \epsilon'(V6 + V7). \quad (14)$$

$$V6C = V6 + \epsilon V5. \quad (15)$$

$$V7C = V7 + \epsilon V5. \quad (16)$$

Envelope waveforms are newly determined from Equations 3 to 5 and Equations 14 to 16, and the modulation degree MOD and the maximum amplitude Vpp are obtained from the maximum value and the minimum value of the envelope waveforms. By omitting explanation of the derivation processes, the modulation degrees MOD5, MOD6 and MOD7 of V5, V6 and V7 have values represented by Equations 20, 21 and 22, and the maximum amplitudes Vpp5, Vpp6 and Vpp7 of V5, V6 and V7 have values represented by Equations 23, 24 and 25. Here, C1 is given by Equation 17, C2 is given by Equation 18, and C3 is given by Equation 19. As described above, K5 and K6 are newly set once every predetermined time, but they are supposed to be unchanged since there are sufficiently large time intervals.

$$C1 = \frac{B1 - A1}{A1 + B1}. \quad (17)$$

$$C2 = \frac{B2 - A2}{A2 + B2}. \quad (18)$$

$$C3 = \frac{B3 - A3}{A3 + B3}. \quad (19)$$

-continued $$MOD5 = \left[\sqrt{1 + \frac{\varepsilon'(1+CI)\cos\alpha}{K5} + \frac{\varepsilon'(1+CI)\cos\alpha}{K6}} - \sqrt{CI^2 + \frac{\varepsilon'(1+CI)CI\cos\alpha}{K5} + \frac{\varepsilon'(1+CI)CI\cos\alpha}{K6}}\right] / \left[\sqrt{1 + \frac{\varepsilon'(1+CI)\cos\alpha}{K5} + \frac{\varepsilon'(1+CI)\cos\alpha}{K6}} + \left[CI^2 + \frac{\varepsilon'(1+CI)CI\cos\alpha}{K5} + \frac{\varepsilon'(1+CI)CI\cos\alpha}{K6}\right]\right].$$ (20)

$$MOD6 = \left[\sqrt{1+\varepsilon K5(1+CI)\cos\alpha} - \sqrt{C2^2\varepsilon K5(1+CI)C2\cos\alpha}\right] / \left[\sqrt{1+\varepsilon K5(1+CI)\cos\alpha} + \sqrt{C2^2\varepsilon K5(1+CI)C2\cos\alpha}\right].$$ (21)

$$MOD7 = \left[\sqrt{1+\varepsilon K6(1+CI)\cos\alpha} - \sqrt{C3^2\varepsilon K6(1+CI)C3\cos\alpha}\right] / \left[\sqrt{1+\varepsilon K6(1+CI)\cos\alpha} + \sqrt{C3^2\varepsilon K6(1+CI)C3\cos\alpha}\right].$$ (22)

$$Vpp5 = \sqrt{1 + \frac{\varepsilon'(1+CI)\cos\alpha}{K5} + \frac{\varepsilon'(1+CI)\cos\alpha}{K6}}.$$ (23)

$$Vpp6 = \sqrt{1+\varepsilon K5(1+CI)\cos\alpha}.$$ (24)

$$Vpp7 = \sqrt{1+\varepsilon K6(1+CI)\cos\alpha}.$$ (25)

In Equations 20 to 25, α denotes phase difference between carriers as described above, and it is obtained from Equation 26 by using pitch pt' in the circumferential direction and beam distance d in the circumferential direction of the guide grooves of the disk.

$$\alpha = 360° \times d/pt'.$$ (26)

As shown in Equation 26, α is inversely proportional to pitch pt' in the circumferential direction of the guide grooves.

Equation 27 represents a relationship among pitch pt' in the circumferential direction, disk radial position r, revolution number of disk N (rpm) and carrier frequency r, and since the carrier frequency f has a constant value of 20 kHz, pitch pt' in the circumferential direction varies in proportion to disk radial position r.

$$pt' = 2\pi r(N/60)/f.$$ (27)

In the case of a 3.5-inch disk with revolution number of 720 rpm, pitch pt'i in the circumferential direction in the innermost magnetic recording area is 80 μm and pitch pt'o in the circumferential direction in the outermost magnetic recording area is 160 μm. Because beam distance d is always constant, phase difference α of the carriers varies with the inner and outer circumferential areas of the disk, as clearly shown by Equation 25. Therefore, the modulation degrees and the maximum amplitudes of the output signals V5C, V6C and V7C, which include the term of the phase difference α as shown in Equations 20 to 25, vary in various manners, following the variations of the phase difference α that depend on the inner and outer circumferential areas of the disk.

Figure 6A:
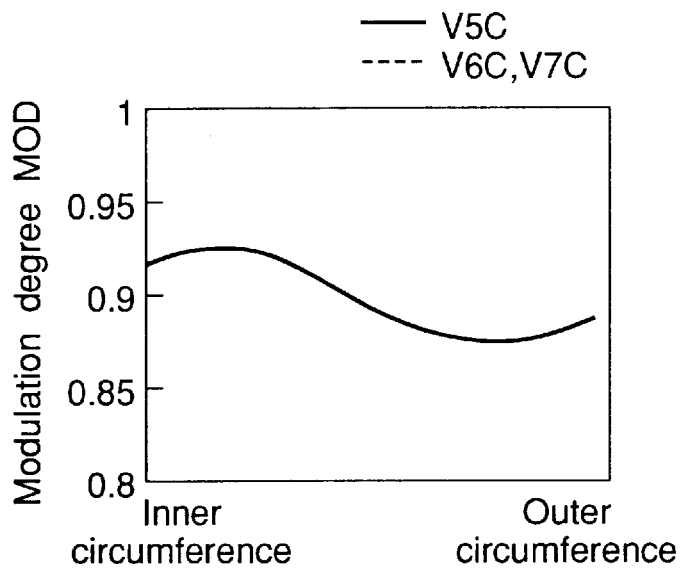
FIG. 6A is a graph on the variation of the modulation degree in a comparison example for a magnetic memory drive.
Figure 6B:
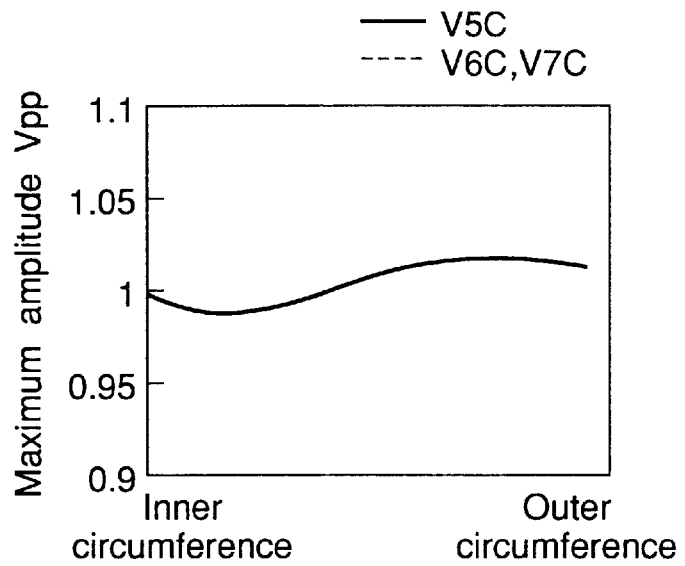
FIG. 6B is a graph on the variation of the maximum amplitude thereof.

FIGS. 6A and 6B show a comparison example of the modulation degree variation and the maximum amplitude variation that depend on the inner and outer circumferential areas of the disk under the conditions of innermost pitch pt'i=80 μm, the outermost pitch pt'o=160 μm, the beam distance d=130 μm, the modulation degree without including crosstalk MOD=0.9, the ratio of crosstalk $\epsilon=\epsilon'=2\%$ and the gain K5=K6=5. As shown in FIGS. 6A and 6B, different variations occur in the modulation degree and the maximum amplitude of the output signals V5C, V6C and V7C, with the result that the phase difference of the voltage signals V8 and V9 (FIG. 4) deviates from π/2. Consequently, errors occur in the calculation results of the aforementioned tracking error signal V10, causing deviation of the beam from a desired position and a resulting tracking error. As already described above, if the crosstalk between the output signals was not taken into account, such a tracking error would not occur due to the variations in the modulation degree and the maximum amplitude that depend on the inner and outer circumferential areas of the disk. This fact is also confirmed because, in Equations 20 to 25, all the terms including phase difference α have the ratio $\epsilon$ or $\epsilon'$ of crosstalk between signals as coefficients, and because if $\epsilon=\epsilon'=0$, the modulation degree and the maximum amplitude have nothing to do with α.

To sum up, in the conventional magnetic memory drive, tracking errors at the inner and outer circumferential areas of the disk are caused by crosstalk between the output signals of the light-receiving sections of the photodetector. Thus, the magnetic head 14 tends to deviate from the magnetic tracking position on the disk 4, and if errors become too much, the reproduction becomes impossible.

The magnetic memory drive according to the embodiment solves the above-mentioned problem and provides a magnetic memory drive which can reduce tracking errors. The drive of the present invention differs from the prior art drives in the following points. In the conventional construction, the ratio of quantities of light of the 0th-order beam to ±1st-order beams generated from the region 16A of the diffraction grating 16 is properly determined according to the machining property of the diffraction grating and the conditions of the signal processing circuit design, or the ratio of quantities of light is set to 5:1 when the optical device fabricated for the optical disk is used. On the other hand, in the embodiment, the quantities of light of the three beams generated from the region 16A of the diffraction grating 16 are designed to be represented by Equation 27 where the crosstalk from the 0th-order light-receiving section to the ±1st-order light-receiving sections is denoted as $\epsilon$ and the crosstalk from the ±1st-order light-receiving sections to the 0th-order light-receiving section is denoted as $\epsilon'$. That is, quantity of light $Q_0$ of the 0th-order light beam and quantity of light $Q_{\pm 1}$ of the ±1st-order light beams has the relationship represented by Equation 1:

$$Q_0 : Q_{\pm 1} = \sqrt{\frac{2 \times \varepsilon'}{\varepsilon}} : 1.$$ (1)

Moreover, when an optical device fabricated integrally as one body with the light source, the diffraction grating and the photodetector is used for the magnetic momory drive, the region 16A of the diffraction grating 16 is used, it is designed so that the ratio of quantities of light generated from the diffraction grating satisfies Equation 1 on the crosstalks $\epsilon$ and $\epsilon'$.

The crosstalks $\epsilon$ and $\epsilon'$ are determined experimenally. In order to measure crosstalk $\epsilon$ from the 0th-order light-receiving section to the ±1st-order light-receiving sections, a beam of diameter of about 40 μm is incident on the 0th-order light-receiving section, and the output V0 of the 0th-order light-receiving section and the output V1 the ±1st-order light-receiving sections are determined. Then, $\epsilon=V1/V0$. The crosstalk $\epsilon'$ is also determined similarly.

The tracking error is reduced by setting the ratio of quantities of light of the three beams as described above, and the reason thereof will be explained below.

The modulation degrees and maximum amplitudes of the output signals V5C, V6C and V7C including crosstalk between the light-receiving sections, which have been outputted from the photodetector 15 and converted to voltage signals in the I-V converters, are represented by Equations 20 to 25. Since the output signals obtained from the original three beams are approximately similar to each other, Equation 28 approximately holds, and since the quantities of light of the ±1st-order beams are almost equal to each other, Equation 29 approximately holds.

$$C1 \approx C2 \approx C3 = C. \quad (28)$$

$$K5 \approx K6 = K. \quad (29)$$

Substitutions of Equations 20 to 25 by Equations 28 and 29 yield Equations 30 to 35. Relationships, MOD6=MOD7 and Vpp6=Vpp7, are readily derived from Equations 30 to 35. Moreover, comparisons between Equations 30 and 31 as well as Equations 33 and 34 clearly show that relationships, MOD5=MOD6=MOD7 and Vpp5=Vpp6=Vpp7, are satisfied in the condition of Equation 36. Therefore, Equation 37 is derived from Equation 36.

$$MOD5 = [\sqrt{1+2\epsilon'(1+C)\cos \alpha/K} - \sqrt{C^{2+2\epsilon'(1+C)C\cos \alpha/K}}]/[\sqrt{1+268'(1+C)\cos \alpha/K} + \sqrt{C^{2+2\epsilon'(1+C)C\cos \alpha/K}}]. \quad (30)$$

$$MOD6 = [\sqrt{1+\epsilon K(1+C)\cos \alpha} - \sqrt{C^{2+\epsilon K(1+C)C\cos \alpha}}]/[\sqrt{1+\epsilon K(1+C)\cos \alpha} + \sqrt{C^{2\epsilon K(1+C)C\cos \alpha}}]. \quad (31)$$

$$MOD7 = [\sqrt{1+\epsilon K(1+C)\cos \alpha} - \sqrt{C^{2+\epsilon K(1+C)C\cos \alpha}}]/[\sqrt{1+\epsilon K(1+C)\cos \alpha} + \sqrt{C^{2+\epsilon K(1+C)C\cos \alpha}}]. \quad (32)$$

$$Vpp5 = \sqrt{1+2\epsilon'(1+C)\cos \alpha/K}. \quad (33)$$

$$Vpp6 = \sqrt{1+\epsilon K(1+C)\cos \alpha}. \quad (34)$$

$$Vpp7 = \sqrt{1+\epsilon K(1+C)\cos \alpha}. \quad (35)$$

$$2\epsilon'/K = \epsilon K. \quad (36)$$

$$K = \sqrt{2\epsilon'/\epsilon}. \quad (37)$$

In other words, when Equation 37 holds, the output signals V5C, V6C and V7C always have the same modulation degree and equal maximum amplitude at any position on the inner and outer circumferential areas of the disk, independently of phase difference α. That is, the waveforms of V5C, V6C and V7C agree with each other. In as example, FIGS. 7A and 7B show variations of the modulation degree and maximum amplitude when the gain K is changed to a value of Equation 39 calculated by Equation 37 in the same conditions of the example of the variations of the modulation degree and maximum amplitude shown in FIGS. 6A and 6B, that is, the innermost pitch pt'i=80 μm, the outermost pitch pt'o=160 μm, the beam distance d=130 μm, the modulation degree without including crosstalk MOD=0.9, and the ratio of crosstalk ε=ε'=2%.

$$K = \sqrt{2\epsilon'/\epsilon} = \sqrt{2 \times 0.02/0.02} = 1.414. \quad (39)$$

Figure 7A:
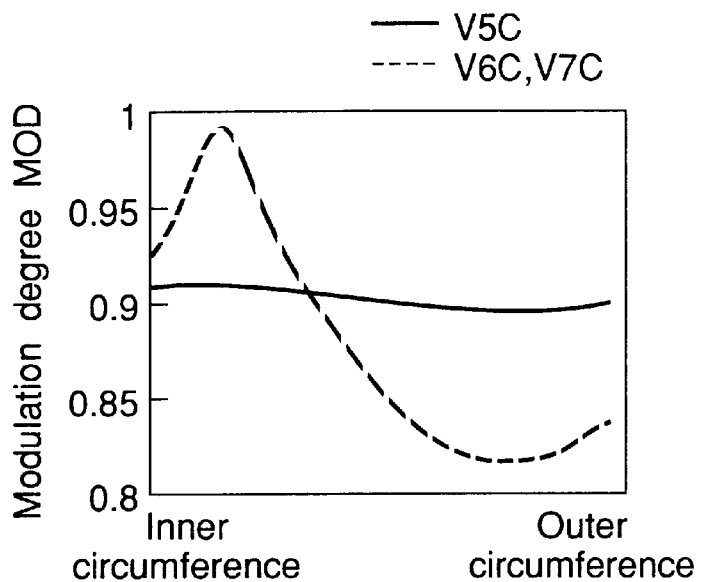
FIG. 7A is a graph on the variation of the modulation degree of the magnetic memory drive.
Figure 7B:
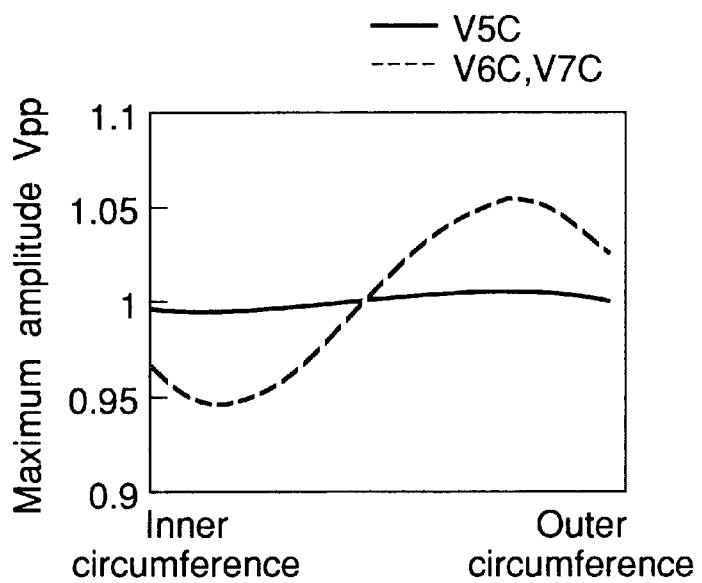
FIG. 7B is a graph on the variation of the maximum amplitude of the magnetic memory drive.

As shown in FIGS. 7A and 7B, when the gain K has a value obtained by Equation 37, the output signals V5C, V6C and V7C always have the same modulation degree and an equal maximum amplitude at any position on the inner and outer circumferential areas of the disk. When the modulation degrees and the maximum amplitudes of the output signals are equal, the phase difference of the voltage signals V8 and V9 is always kept at π/2. Therefore, no error occurs in the result of calculations for the tracking error signal V10, and consequently, no tracking error is produced.

Here, K represents a gain of each of the gain-controlled amplifiers 476 and 479 found from Equations 9 and 10, and it is a ratio of maximum amplitudes of the output signals V5 and V6 or V5 and V7. More specifically, the maximum amplitude has an error for (A1+B1) or (A2+B2) or (A2+B2) due to crosstalk, but this value is negligible with respect to the value of K. The maximum amplitude of the output signal is directly proportional to the quantity of received light of the photodetector 15. V5 is an output signal from the light-receiving section 15B or 15E that receives the 0th-order beam, V6 and V7 are output signals from the light-receiving section 15A or 15D and 15C or 15F. In other words, K is equal to a ratio of quantities of light of the three beams, that is, the 0th-order beam and the ±1st-order beams.

Therefore, as described above, when the ratio of quantities of light of the three beams, that is, the 0th-order beam and the ±1st-order beams, is represented by Equation 28, it is explained that no tracking error occurs because the modulation degrees and the maximum amplitudes of the output signals V5, V6 and V7 are always equal on the inner circumferential and outer circumferential areas of the disk independent of crosstalk between the light-receiving sections. Although omitted in the explanation, during the calculation processes of Equations 21 to 26, it is assumed that the crosstalk ratios ε and ε' are small. When ε or ε' exceeds 5%, the approximation is no longer holds, and tracking errors increase with an increase in crosstalk ratio even in the case of the above-mentioned optimal ratio of quantities of light. However, because the crosstalk ratio between the light-receiving sections is not more than 5% generally, the tracking error is sufficiently small when the 0th-order beam and the ±1st-order beams are set to have the above-mentioned ratio of quantities of light. Moreover, although the tracking error increases as the ratio of quantities of light deviates from the above-mentioned value, the experiments and simulations show that, in the case when the crosstalk ratio between the light-receiving sections is 2 to 3%, the level within ±20% of the optimal ratio of quantities of light does not raise any problem of tracking errors practically.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic memory drive, which comprises:
    a light source which emits a light beam;
    a diffraction grating which receives the beam emitted by the light source to generate three beams of 0th-order and ±1st-order light beams;
    a condensing system which converges the beams generated from the diffraction grating into a minute spot on a magnetic recording medium on which periodic physical variations are formed for providing variations in reflectivity;
    a photodetector which receives the beams reflected and diffracted from the magnetic recording medium and again passing through the condensing system and outputs signals corresponding to quantities of the received beams;
    a signal processor which processes the signals outputted from the photodetector to output a tracking error;

a driver which receives the tracking error signal outputted from the signal processor and positions the beams on a desired track; and a magnetic head which records information on the magnetic recording medium or reproduces or erases information on the magnetic recording medium;

wherein the photodetector comprises a plurality of light-receiving sections, and when crosstalk from a light-receiving section for the 0th-order beam to light-receiving sections for the ±1st-order beams is $\epsilon$ and crosstalk from the light-receiving sections for the ±1st-order beam to the light-receiving section for the 0th-order is $\epsilon'$ in the light-receiving sections of the photodetector, quantity of light $Q_0$ of the 0th-order light beam and quantity of light $Q_{\pm 1}$ of the ±1st-order light beams has a relationship represented by a following equation:

$$Q_0 : Q_{\pm 1} = \sqrt{\frac{2 \times \varepsilon'}{\varepsilon}} : 1.$$

2. An integrated optical device, comprising:
a light source for emitting a light beam;

a diffraction grating for receiving the beam emitted from the light source and for generating three beams of 0th-order and ±1st-order light beams; and a photodetector which receives a beam and outputs a signal corresponding to a quantity of received light;

wherein the photodetector comprises a plurality of light-receiving sections, and when crosstalk from a light-receiving section for the 0th-order beam to light-receiving sections for the ±1st-order beams is $\epsilon$ and crosstalk from the light-receiving sections for the ±1st-order beam to the light-receiving section for the 0th-order is $\epsilon'$ in the light-receiving sections of the photodetector, quantity of light $Q_0$ of the 0th-order light beam and quantity of light $Q_{\pm 1}$ of the ±1st-order light beams has a relationship represented by a following equation:

$$Q_0 : Q_{\pm 1} = \sqrt{\frac{2 \times \varepsilon'}{\varepsilon}} : 1.$$

\* \* \* \* \*